(12) United States Patent
Wawchuk

(10) Patent No.: US 9,347,593 B2
(45) Date of Patent: May 24, 2016

(54) COUPLING DEVICE FOR FLUID LINES

(71) Applicant: John Richard Wawchuk, Lloydminster, CA (US)

(72) Inventor: John Richard Wawchuk, Lloydminster, CA (US)

( * ) Notice: Subject to any disclaimer, the term of this patent is extended or adjusted under 35 U.S.C. 154(b) by 365 days.

(21) Appl. No.: 14/087,804

(22) Filed: Nov. 22, 2013

(65) Prior Publication Data

US 2014/0138948 A1 May 22, 2014

Related U.S. Application Data

(63) Continuation of application No. 13/588,161, filed on Aug. 17, 2012, now abandoned.

(51) Int. Cl.
*F16L 37/18* (2006.01)

(52) U.S. Cl.
CPC .................................. *F16L 37/18* (2013.01)

(58) Field of Classification Search
USPC ........................... 285/312, 314–315, 358, 394
See application file for complete search history.

(56) References Cited

U.S. PATENT DOCUMENTS

| | | | |
|---|---|---|---|
| 2,478,586 A | 8/1949 | Krapp | |
| 2,518,026 A * | 8/1950 | Krapp | F16L 37/18 285/312 |
| 3,195,934 A * | 7/1965 | Parrish | F16L 37/18 285/312 |
| 3,439,942 A | 4/1969 | Moore et al. | |
| 4,222,593 A | 9/1980 | Lauffenburger | |
| 4,295,670 A * | 10/1981 | Goodall | F16L 37/18 285/312 |
| 4,519,635 A * | 5/1985 | McMath | F16L 37/18 285/312 |
| 4,618,171 A * | 10/1986 | Fahl | F16L 37/18 285/312 |
| 4,647,075 A | 3/1987 | Vargo | |
| 5,005,876 A * | 4/1991 | Fahl | F16L 37/18 285/311 |
| 5,295,717 A * | 3/1994 | Chen | F16L 37/18 285/312 |
| 5,722,697 A * | 3/1998 | Chen | F16L 37/18 285/276 |
| 5,988,693 A * | 11/1999 | Street | F16L 37/18 285/312 |
| 6,015,168 A | 1/2000 | Fahl | |
| 6,047,995 A * | 4/2000 | Kotake | F16L 37/18 285/312 |
| 6,089,619 A | 7/2000 | Goda | |
| 7,354,077 B1 * | 4/2008 | Jumonville | F16L 37/18 285/312 |

(Continued)

FOREIGN PATENT DOCUMENTS

GB 2211258 6/1989
WO 2011139152 11/2011

*Primary Examiner* — Aaron Dunwoody
*Assistant Examiner* — Fannie Kee
(74) *Attorney, Agent, or Firm* — Kyle R. Satterthwaite; Ryan W. Dupuis; Ade & Company Inc

(57) ABSTRACT

A coupling device for fluid lines includes a female part having a rotatable locking arm with a cam, and a male part defining a longitudinal channel and a circumferential groove on its external surface, The male part is inserted into the female part by rotating the locking arm to its unlocked position, aligning the longitudinal channel with the cam, and sliding the cam within the longitudinal channel. The male part is locked into the female part by rotating the cam within the circumferential groove away from the longitudinal channel, and rotating the locking arm into its locked position so that the cam protrudes further into the circumferential groove. Even when the locking arm is rotated to its unlocked position, the cam engages the circumferential groove to retain the male part within the female part unless the cam is rotated within the circumferential groove into alignment with the longitudinal channel.

4 Claims, 3 Drawing Sheets

(56) References Cited

U.S. PATENT DOCUMENTS

| | | | |
|---|---|---|---|
| 7,543,857 B2 * | 6/2009 | Dole | F16L 37/18 285/312 |
| 7,988,200 B2 | 8/2011 | Krywitsky | |
| 2001/0045745 A1 * | 11/2001 | Collier | F16L 37/18 285/81 |
| 2003/0151252 A1 * | 8/2003 | Dole | F16L 37/18 285/312 |
| 2011/0095525 A1 * | 4/2011 | Eich | F16L 37/18 285/312 |

* cited by examiner

COUPLING DEVICE FOR FLUID LINES

FIELD OF THE INVENTION

The present invention relates to a coupling device for fluid lines.

BACKGROUND OF THE INVENTION

Cam-and-groove couplings are used to connect fluid lines. A conventional cam-and-groove coupling consists of a female part, a male part and at least one locking arm, The female part and male part are annular walls. The male part is shaped to slidingly insert into and withdraw from the female part and has a groove formed circumferentially on its outside surface. The female part has at least one aperture in its wall. The locking arm is rotatably connected to the female part and has a cam on its surface that is shaped to engage the groove of the male part. When the male part is inside the female part, the locking arm is rotatable between a locked position in which the cam protrudes through the aperture and lockingly engages the groove to sealably connect the male part to the female part, and an unlocked position in which the cam is substantially outside of the female part and thus permits the male part to withdraw from the female part.

When the locking arm of a conventional cam-and-groove coupling is in the unlocked position, the male part may accidentally withdraw from the female part because the male part is retained in the female part only by relatively low friction between the two parts. Such friction may be overcome by the residual fluid pressure in the fluid lines or the weight of the fluid lines when they are inclined or unsupported. This separation can result in fluid spillage, which is especially undesirable if the fluid is hazardous or contaminating to the environment. Further, if the fluid pressure is significant, the separation may occur violently and pose a risk of bodily injury or property damage.

In the prior art, modifications to cam-and-groove couplings and other types of lockable couplings permit the female part to retain the male part. U.K. Patent Application GB 2,211,258 to Marshall, U.S. Pat. No. 7,988,200 to Krywitsky, PCT International Application WO 2011/139152 to Andries et al., and the "PT Pressure Safe" cam-and-groove coupling invented by Paul Schwindt and Alan Littlefield and marketed by PT Coupling® each disclose connections in which a pin formed on the surface of one or both of the male part, or the female part, engages a compatible channel formed in the wall of the other part. Such designs have several potential disadvantages including that the pin and channel may complicate the manufacturing of the coupling, may create additional stress concentrations in the wall, and may deform or weaken with repeated use or abuse.

Accordingly, there remains a need for a modified cam-and-groove coupling where the female part retains the male part even when the locking arm is in the unlocked position.

SUMMARY OF THE INVENTION

The present invention provides a coupling device for coupling a first fluid line to a second fluid line. The device includes a female part and a male part. The female part includes a line end for sealably connecting to the first fluid line, a female mating end, and at least one locking arm. The female mating end includes a cylindrical annular wall with an aperture. The at least one locking arm includes a cam. The locking arm is rotatably connected to the female mating end and rotatable between a locked position in which the cam protrudes through the aperture to a locked position, and an unlocked position in which the cam also protrudes through the aperture to an unlocked position. The male part includes a line end for sealably connecting to the second fluid line, and a male mating end. The male mating end includes a cylindrical annular wall, including an outer surface with a circumferentially formed groove and a longitudinally formed channel recessed in the outer surface and extending parallel to a longitudinal axis of the cylindrical annular wall into the groove from an end of the male mating end that lies opposite to the line end, thereby enabling sliding receipt of the cam in the longitudinally formed channel during insertion and withdrawal of the male mating end of the male part to and from the female mating end of the female part such that the cam is slidable into the circumferentially formed groove via the longitudinally formed channel during insertion of the male mating end of the male part into the female mating end of the female part. As a result, when the male mating end is inserted into the female mating end of the female part and the cam is received in the circumferentially formed groove, the cam, in both the locked and unlocked positions, engages the male cylindrical annular wall within the groove to retain the male mating end in the female mating end, unless the male part is rotationally positioned relative to the female part such that cam is aligned with the channel, in which case the male part is releasable from the female part by sliding of the cam back along the longitudinally formed channel.

In one embodiment, the coupling device has two locking arms, the male mating end has two channels and the angular separation between the two locking arms is equal to the angular separation between the two channels.

In one embodiment, the coupling device further includes a stop that interrupts the groove from extending along the entire circumference of the male mating end. In one embodiment, the angular separation between the stop and the immediately adjacent channel is substantially equal in both the clockwise and counter-clockwise directions.

In one embodiment, the coupling further includes markings on one or both of the male part or the female part to indicate when the cams is aligned with the channel or when the cam is not aligned with the channel.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF EXAMPLES OF EMBODIMENTS OF THE PRESENT INVENTION

The invention relates to a coupling device for fluid lines. The following is a detailed description of an embodiment of the present invention.

When describing the present invention, all terms not defined herein have their common art-recognized meanings. As used herein, "fluid line" refers to any vessel for transferring a substance in solid, liquid, or gas state, and includes, without limiting the generality of the foregoing, a pipe, a hose, or a spigot.

Figure 1:
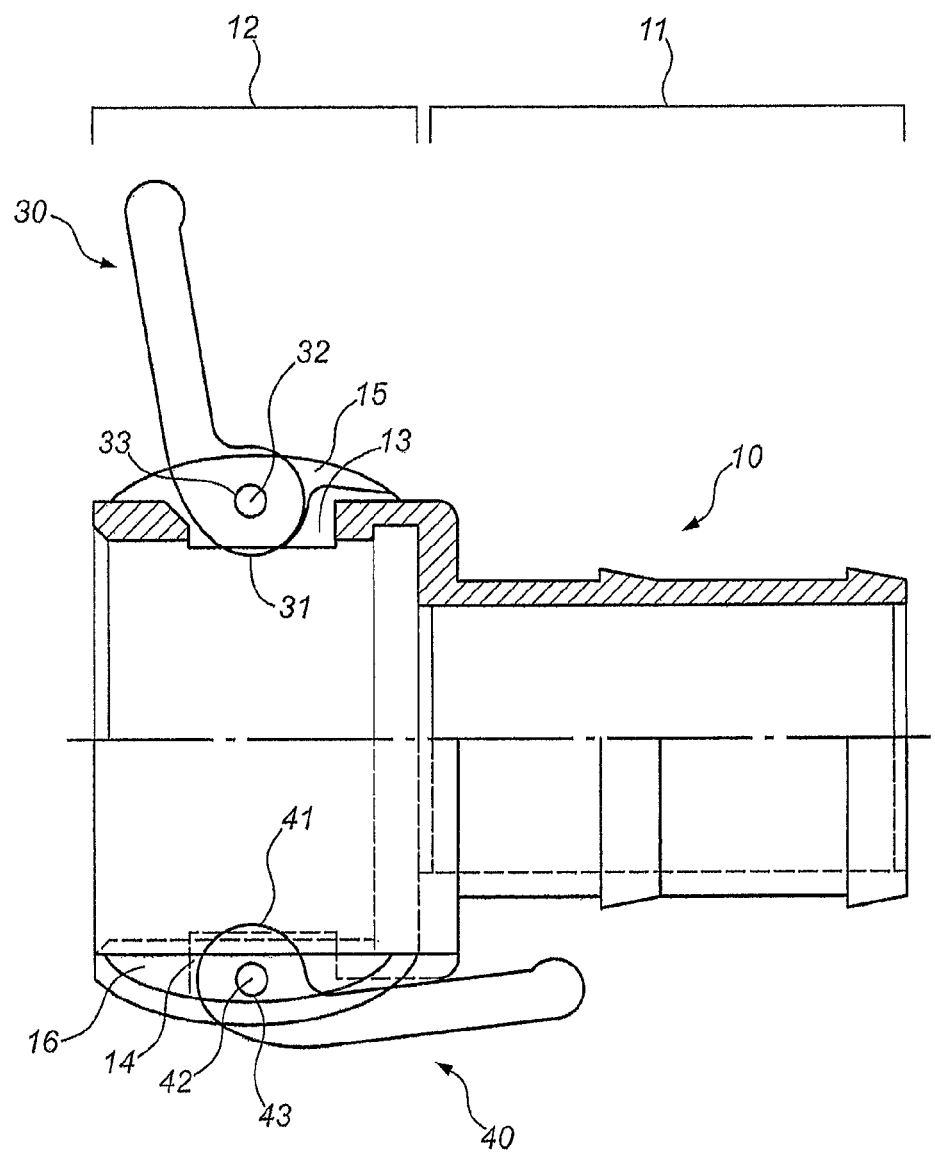
FIG. 1 is a side half-sectional view of a female part with two locking arms.
Figure 2:
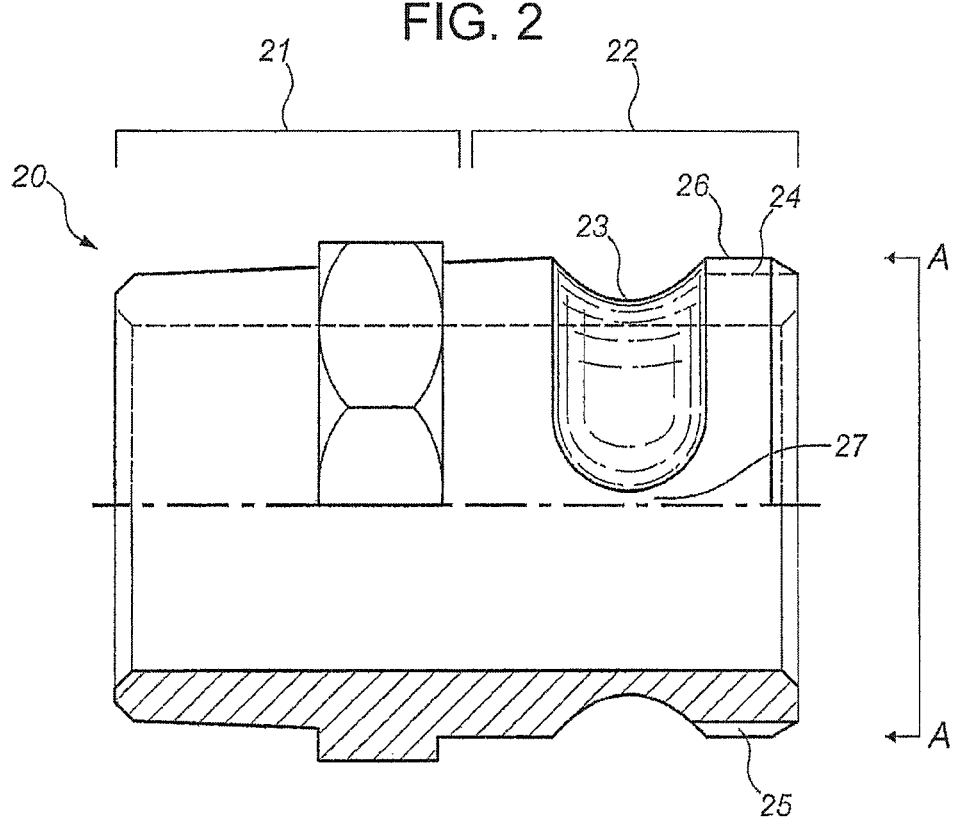
FIG. 2 is a side half-sectional view of a male part.
Figure 3:
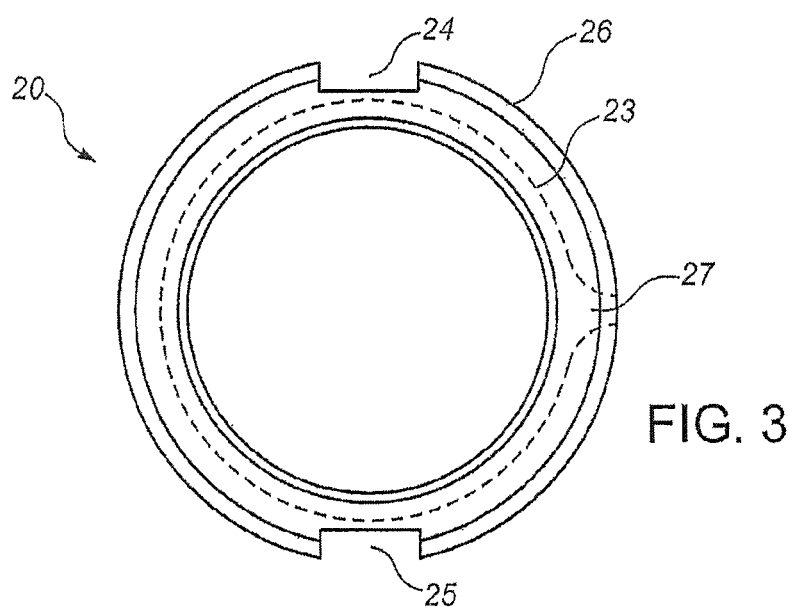
FIG. 3 is an end view of the male part shown in FIG 2 as seen from line A-A.

Referring to FIGS. 1 to 3, the coupling device comprises a female part (10), and a male part (20). The female part (10) and male part (20) should be manufactured from a material that is chemically resistant to the substance to be transferred in the fluid line, and that has sufficient rigidity and strength to resist deformation and damage with repeated use. Suitable materials may include iron-carbon alloyed steels such as stainless steel. Suitable manufacturing methods may include forging, machining, casting and extrusion.

Referring to FIG. 1, the female part (10) has a line end (11), a female mating end (12), a first locking arm (30), and an optional second locking arm (40). In other embodiments, the number of locking arms (40) may differ, so long as there is at least one locking arm (30). The line end (11) is configured to sealably connect to an end of a fluid line using connectors known in the art such as, but not limited to, a threaded connection (not shown). The female mating end (12) includes a cylindrical annular wall with a first aperture (13), and an optional second aperture (14).

Figure 4:
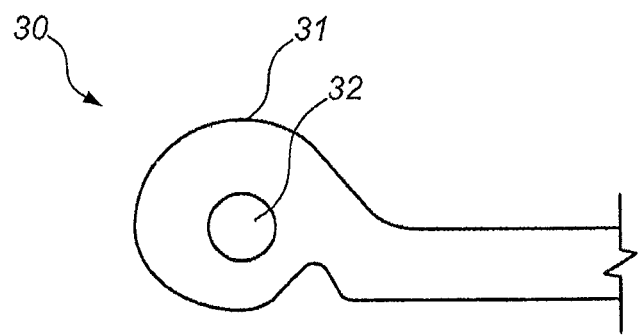
FIG. 4 is a side detail view of part of a locking arm.
Figure 5:
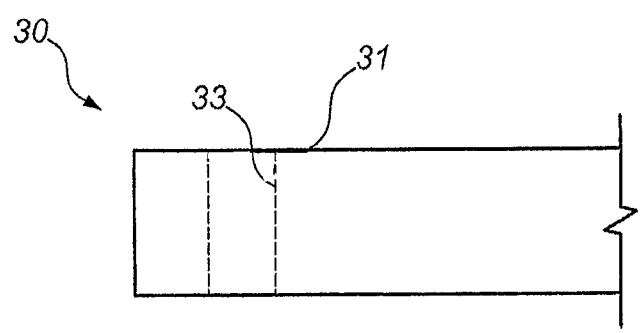
FIG. 5 is a plan detail view of part of a locking arm.

Referring to FIGS. 1, 4 and 5, the locking arms (30, 40) each have a cam (31, 41). The locking arms (30, 40) are rotatably connected to the female mating end (12) by pins (32, 42) inserted through holes (33, 43) formed in the locking arms (30, 40) and holes formed in thickened portions (15, 16) of the female mating end (12). The precise manner in which the locking arms (30, 40) are rotatably connected to the female part (10) is not essential. The locking arms (30, 40) are rotatable between a locked position and an unlocked position. Referring to FIG. 1, the locking arm (40) is shown in the locked position and the locking arm (30) is shown in the unlocked position. When a locking arm (30, 40) is in the locked position, its cam (31, 41) protrudes through the aperture (13, 14) to a locked position, and when the locking arm (30, 40) is in the unlocked position, the cam (31, 41) protrudes through the aperture to an unlocked position. When a cam (31, 41) is in the locked position, it protrudes through the aperture (13, 14) to a greater depth than when the cam (31, 41) is in the unlocked position.

Referring to FIGS. 2 and 3, the male part (20) has a line end (21) and a male mating end (22). The line end (21) is configured to sealably connect to an end of a fluid line using connectors known in the art such as, but not limited to, a threaded connection (not shown). The male mating end (22) includes a cylindrical annular wall shaped to sealably and slidingly insert into and withdraw from the female mating end (12) and rotate about its cylindrical axis relative to and within the female mating end (12). The male mating end (22) has an outside surface (26) with a circumferentially formed groove (23) and defining a first longitudinally formed channel (24) and an optional second longitudinally formed channel (25). The channels (24, 25) extend from the end of the male mating end (22) into the groove (23).

The groove (23) is positioned on the male mating end (22) so that it is exposed by the apertures (13, 14) when the male mating end (22) is fully inserted into the female mating end (12). The groove (23) is shaped to receive and allow the cams (31, 41) to rotate between their locked position and unlocked position. The groove (23) is also shaped so that the cams (31, 41) can slide circumferentially along the groove (23) when the male mating end (22) is rotated within the female mating end (12).

The channels (24, 25) are positioned so that their angular separation corresponds to the angular spacing between the apertures (13, 14). In this manner, the apertures (13, 14) simultaneously expose both channels (24, 25) when the male mating end (22) is rotated into such a position. For example, in FIGS. 1 to 3, both the angular spacing of the channels (24, 25) and the apertures (13, 14) is approximately 180 degrees, but a different angular spacing may be selected. The channels (24, 25) are shaped to receive and allow the cams (31, 41) to slide longitudinally along the channels (24, 25) when the male mating end (22) is inserted into or withdrawn from the female mating end (12).

In one embodiment, as shown in FIGS. 2 and 3, a stop (27) interrupts the groove (23) from extending along the entire circumference of the male mating end (22) and limits the cams (31, 41) from sliding circumferentially along the groove (23). When the angular separation of the channels (24, 25) is the same in both the clockwise and counterclockwise directions, the stop (27) is preferably positioned so that the angular separation between the stop (27) and the immediately adjacent channels (24, 25) is equal. For example, in FIGS. 2 and 3, the angular separation between the channels (24, 25) is 180 degrees in both directions, and the angular separation between the stop (27) and each of the adjacent channels (24, 25) is 90 degrees. In this manner, the stop (27) defines the position that simultaneously maximizes the angular separation of both of the cams (31, 41) from both of the channels (24, 25).

In one embodiment, markings may be made on one or both of the female part (10) and the male part (20) to assist the user in determining when the cams (31, 41) are aligned or not aligned with the channels (24, 25). The markings may be positioned on the male part (20) so that they remain visible to the user even when the male mating end (22) is fully inserted in the female mating end (12). The markings may take the form of graphical indicators such as arrows or alignment marks, or textual indicators. For example, the words "UNLOCKED" may be engraved on the outer surface of the male part (20) to coincide with the position of the channels (24, 25), and the words "LOCKED" may be engraved on the outer surface of the male part (20) to coincide with a position half-way between the two channels (24, 25).

The operation of the coupling device is now described. The end of a first fluid line is sealably connected to the line end (11) of the female part (10), and the end of a second fluid line is sealably connected to the line end (21) of the male part (20). The locking arms (30, 40) are both rotated to their unlocked positions. The male part (20) is rotated relative to the female part (10) so that the channels (24, 25) align with the cams (31, 41). In this configuration, the male mating end (22) is inserted into the female mating end (22), with the cams (31, 41) sliding longitudinally along the channels (24, 25) and into the groove (23).

Once the male mating end (22) is fully inserted into the female mating end (12), the male part is rotated relative to the male part (20), with the cams (31, 41) sliding circumferentially along the groove (23) and so that the channels (24, 25) are no longer aligned with the cams (31, 41). In one embodiment, the user may rotate the male part (20) until the cams (31, 41) stop against the stop (27). In another embodiment, the user may rotate the male part (20) until the cams (31, 41) align with a "LOCKED" marking engraved on the outer surface of the male part (20) to coincide with a position half-way between the two channels (24, 25). The locking arms (30, 40) are then both rotated to the locked position so that the cams (31, 41) are also in their locked position. In this configuration, the cams (31, 41) bind against the annular wall within the groove (23) and lock the male mating end (20) in the female mating end (10). Fluid may then be transferred from the first line through the coupling device (10, 20) and into the second line.

After the fluid transfer has stopped, the locking arms (30, 40) are both rotated to their unlocked position so that the cams (31, 41) are also in their unlocked position. In this configuration, the cams (31, 41) engage the annular wall within the groove (23) to retain the male mating end (22) within in the female mating end (12), and thereby prevent the male mating end (22) against accidentally separating from the female mating end (12). In order to withdraw the male mating end (22) from the female mating end (12), the male part (20) is rotated relative to the female part (10), with the cams (31, 41) sliding circumferentially within the groove (23) until the cams (31, 41) are aligned with the channels (24, 25). In one embodiment, the user may rotate the male part (10) until the cams (31, 41) align with an "UNLOCKED" marking engraved on the outer surface of the male part (20) to coincide with the position of the channels (24, 25). The male mating end (22) may then be withdrawn from the female mating end (12) with the cams (31, 41) sliding out of the groove (23) and longitudinally along the channels (24, 25) until separation of the male mating end (22) and the female mating end (12) is complete.

Although the present invention has been described with reference to specific embodiments, they are intended to be illustrative only and not limit the scope of the claims, which should be given the broadest interpretation consistent with the description as a whole.

What is claimed:

1. A coupling device for coupling a first fluid line to a second fluid line, said device comprising:
   (a) a female part comprising:
      (i) a line end for sealably connecting to the first fluid line; and
      (ii) a female mating end comprising a cylindrical annular wall with an aperture;
      (iii) at least one locking arm comprising a cam, said at least one locking arm rotatably connected to the female mating end and rotatable between a locked position in which the cam protrudes through the aperture to a locked position, and an unlocked position in which the cam also protrudes through the aperture to an unlocked position;
   (b) a male part comprising:
      (i) a line end for sealably connecting to the second fluid line; and
      (ii) a male mating end comprising a cylindrical annular wall, which comprises an outer surface, a circumferentially formed groove in said outer surface, and a longitudinally formed channel recessed in said outer surface and extending parallel to a longitudinal axis of the cylindrical annular wall into the groove from an end of the male mating end that lies opposite to the line end of the male part, thereby enabling sliding receipt of the cam in said longitudinally formed channel during insertion and withdrawal of the male mating end of the male part to and from the female mating end of the female part such that the cam is slidable into the circumferentially formed groove via said longitudinally formed channel during insertion of the male mating end of the male part into the female mating end of the female part;
   whereby, with the male mating end of the male part inserted into the female mating end of the female part and the cam received in the circumferentially formed groove, the cam, in both the locked and unlocked positions thereof, engages the male cylindrical annular wall within the groove to retain the male mating end in the female mating end, unless the male part is rotationally positioned relative to the female part such that the cam is aligned with the channel, in which case the male part is releasable from the female part by sliding of the cam back along the longitudinally formed channel.

2. The coupling device of claim 1 wherein the female part has two locking arms, the male mating end has two channels and angular separation between the two locking arms is equal to angular separation between the two channels.

3. The coupling device of claim 2 further comprising a stop that interrupts the groove from extending along an entire circumference of the male mating end, wherein angular separation between the stop and each of the two channels is substantially equal.

4. The coupling device of claim 1 further comprising a stop that interrupts the groove from extending along an entire circumference of the male mating end.

* * * * *